J. MACNEE.
Butter-Worker.

No. 162,758.

Patented May 4, 1875.

WITNESSES
Nat. E. Oliphant
M. F. Halleck

By

INVENTOR
James Macnee,
Chas. H. Fowler
Attorney

THE GRAPHIC CO. PHOTO-LITH. 39 & 41 PARK PLACE, N.Y.

UNITED STATES PATENT OFFICE.

JAMES MACNEE, OF WEBSTER CITY, IOWA.

IMPROVEMENT IN BUTTER-WORKERS.

Specification forming part of Letters Patent No. 162,758, dated May 4, 1875; application filed April 1, 1875.

*To all whom it may concern:*

Be it known that I, JAMES MACNEE, of Webster City, in the county of Hamilton and State of Iowa, have invented a new and valuable Improvement in Butter-Workers; and I do hereby declare that the following is a full, clear, and exact description of the construction and operation of the same, reference being had to the annexed drawings, making a part of this specification, and to the letters and figures of reference marked thereon.

Figure 1:
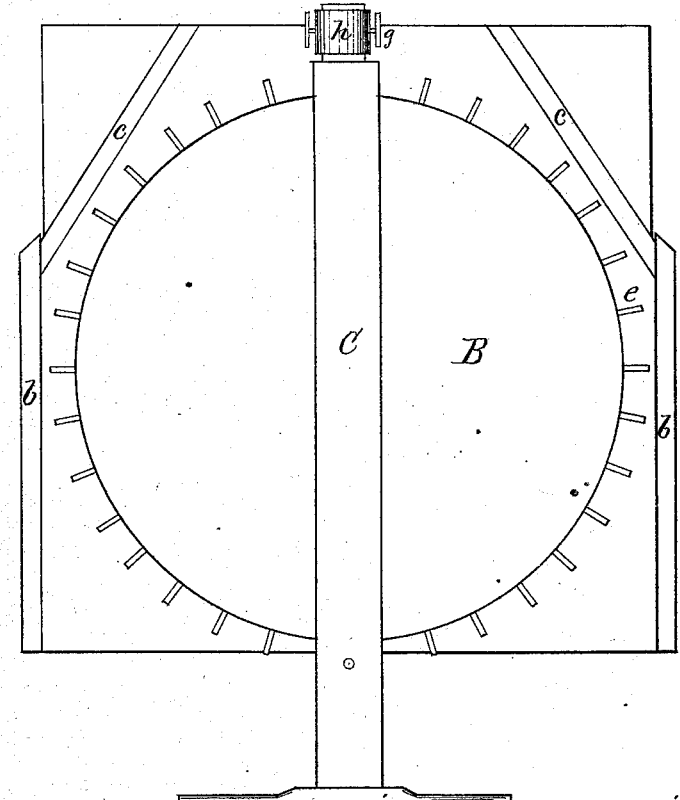
Figure 1:
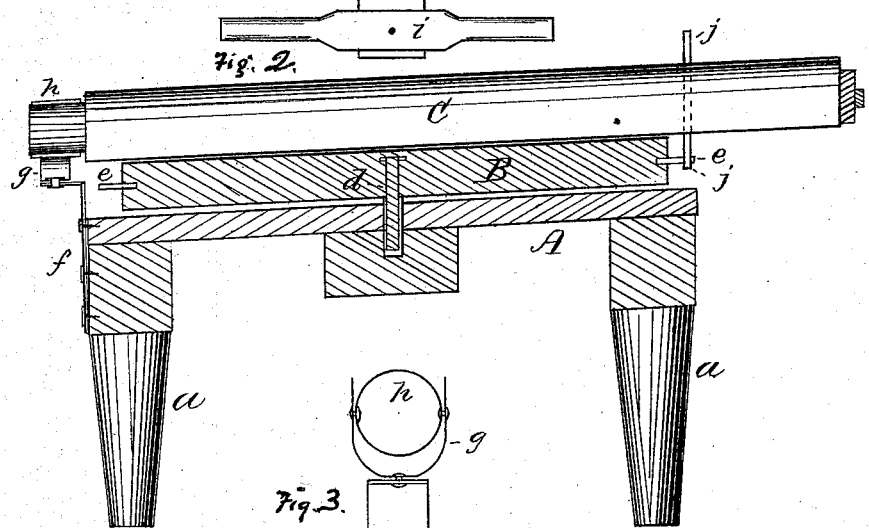
Figure 1:
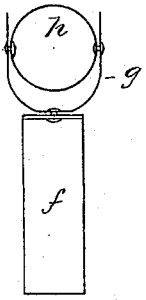

Figure 1 of the drawing is a representation of a plan or top view of my invention. Fig. 2 is a sectional elevation of the same.

This invention relates to a means for kneading, pressing, or working the milk and water from butter, so as to prepare it for shipment; and my invention consists of a hand-lever, round or oval upon one side, and flat upon the reverse side, and swiveled to a table, in such a manner that either side may be used when desired. My invention also consists in providing such lever, near its outer end, with projecting pins, which engage with teeth or projecting pins upon the outer periphery of a revolving kneading-board, for the purpose as will be hereinafter more fully described.

In the drawings, A is designed to represent a table, provided with suitable legs, $a$; the table upon its upper surface being slightly inclined, and having strips $b\ c$, so that the milk and water from the butter will be prevented from running over the sides, but pass down over the rear edge of the table into a suitable receptacle placed to receive it.

Upon the table A is a kneading-board, B, connected thereto by a central axis, $d$, so as to be rotated freely to turn the butter as it is being worked, said board being of a circular form, and having upon its outer periphery teeth or projecting pins $e$. Secured to the rear of the table, and upon its side, is the universal joint, consisting of the plate $f$, to which is swiveled the U-shaped bar $g$, carrying the swiveled ring $h$, into which the end of a hand-lever, C, is inserted, such lever being flat upon one side and oval or rounded upon the reverse side, and having near its handle $i$, pins $j\ j$, which engage with the projecting pins or teeth $e$ upon the outer periphery of the board B, by which means the kneading-board is made to revolve while the butter is being worked. It will be seen that the hand-lever C may be used with either side to the kneading-board, the round or oval part being designed to give more effective pressure when such is required, and may be removed when desired to be cleaned.

I am aware that heretofore a rotating table and a pivoted hand-lever have been used, and I therefore lay no claim to such invention, broadly; but What I do claim, and desire to secure by Letters Patent, is—

1. The combination, with a suitable kneading board or table, of the removable hand-lever C, of the form shown and described, the same being connected to the table in a manner so that either side of such lever may be used, as and for the purpose specified.

2. The combination, with the table A and revolving kneading-board B, provided upon its outer periphery with teeth or projecting pins $e$, of the swiveled hand-lever C, having near its outer end pins $j\ j$, substantially as and for the purpose set forth.

In testimony that I claim the above, I have hereunto subscribed my name in the presence of two witnesses.

JAMES MACNEE.

Witnesses:
G. B. PRAY,
J. F. McCALMONT.